J. C. CRANDALL.
Child's Carriage.

No. 110,744.  Patented Jan. 3, 1871.

Witnesses:
C. Wahlers
E. F. Kastenhaber

Inventor:
John C. Crandall
By VanSantvoord & Hauff
his Attys

United States Patent Office.

JOHN C. CRANDALL, OF NEW YORK, N. Y.

Letters Patent No. 110,744, dated January 3, 1871.

IMPROVEMENT IN CHILDREN'S CARRIAGES.

The Schedule referred to in these Letters Patent and making part of the same.

*To all whom it may concern:*

Be it known that I, JOHN C. CRANDALL, of the city, county, and State of New York, have invented a new and useful Improvement in Children's Carriages; and I do hereby declare the following to be a full, clear, and exact description thereof, which will enable those skilled in the art to make and use the same, reference being had to the accompanying drawing forming part of this specification, in which drawing—

Figure 3:
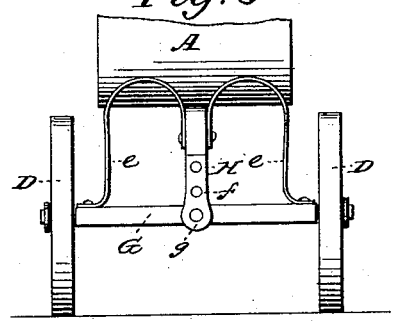
Figure 4:
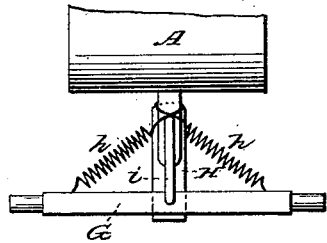

Figures 3, 4, and 5 are similar views of various modifications.

Figure 6 is a side view of the modification shown in fig. 5.

Similar letters indicate corresponding parts.

This invention relates to a children's carriage, the box of which is connected to the front axle by a single reach, fastened permanently to said box and connected to the front axle by means of a pivot and springs, as will hereinafter more fully be set forth.

In the drawing—

The letter A designates the box of a children's carriage, which is provided with a handle, B, projecting from its rear end, and which is supported by two hind wheels, C, and two front wheels, D, being connected to the rear axle E by two curved standards, F, and to the front axle G by a single reach, H.

Figure 1:
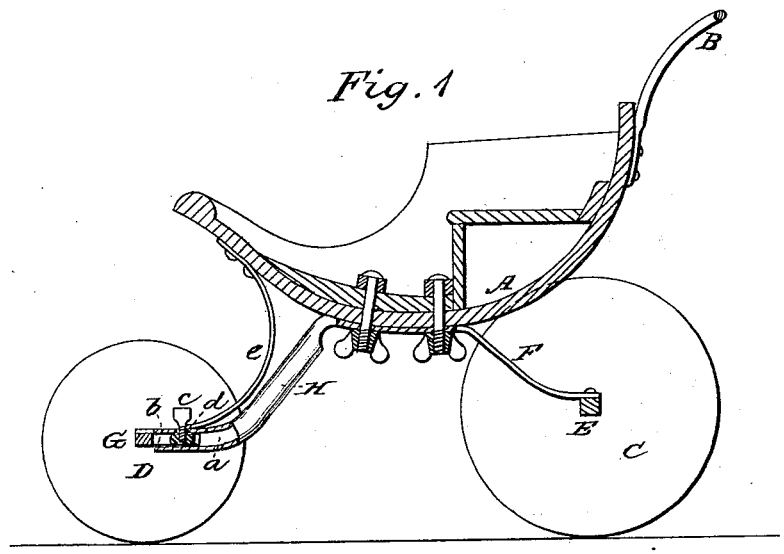
Figure 1 represents a longitudinal vertical section of this invention.

This reach is firmly secured to the bottom of the box, and its outer end is provided with a socket, *a*, to receive a pivot, *b*, which projects from the inner side of the front axle, as shown in fig. 1.

A set-screw, *c*, which is tapped into the pivot *b*, serves to retain the same in its socket, said set-screw passing through an oblong slot, *d*, made near the end of the reach H, and running parallel with the axle G, so that said front axle is free to oscillate in a vertical plane, the extent of its oscillations being limited by the set-screw and slot.

Two springs, *e e*, which extend from the box to the front axle, have a tendency to retain the latter in a horizontal position; but if one of the front wheels strikes a stone or other obstruction, the springs *e e* yield, and said wheel is enabled to pass over the obstruction without endangering the stability of the carriage or without producing any disagreeable shock on the occupant thereof.

Figure 2:
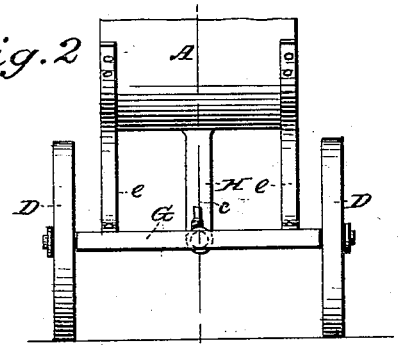
Figure 2 is a front view of the same.

Instead of providing the reach H with a tubular socket, as shown in figs. 1 and 2, it may be made with a bifurcated end, *f*, which straddles the front axle and receives a pivot, *g*, (see fig. 3,) on which said axle is free to oscillate.

The springs *e e*, instead of running from the front axle to the box, may be curved, as shown in fig. 3, and connected at their inner ends to the reach.

If desired, spiral springs *h h* may be applied, as shown in fig. 4, instead of flat springs, and the pivot on which the front axle oscillates may be formed by the end of an L-shaped wire, *i*, secured to the reach.

What I claim as new, and desire to secure by Letters Patent, is—

In a children's carriage, the arrangement of a single reach, which is rigidly connected at one end to the box of the carriage, while its other end connects with the front axle by means of a pivot and one or more springs, substantially in the manner and for the purpose herein shown and described.

JOHN C. CRANDALL.

Witnesses:
C. WAHLERS,
E. F. KASTENHUBER.